United States Patent
Pavone et al.

(10) Patent No.: US 9,410,480 B2
(45) Date of Patent: Aug. 9, 2016

(54) METHOD FOR USE OF THE SYNTHESIS GAS THAT COMES FROM A GASIFIER

(75) Inventors: Domenico Pavone, Bochum (DE); Ralf Abraham, Bergkamen (DE)

(73) Assignee: ThyssenKrupp Uhde GmbH, Dortmund (DE)

( * ) Notice: Subject to any disclaimer, the term of this patent is extended or adjusted under 35 U.S.C. 154(b) by 1200 days.

(21) Appl. No.: 12/998,863

(22) PCT Filed: Dec. 11, 2009

(86) PCT No.: PCT/EP2009/008864
§ 371 (c)(1),
(2), (4) Date: Jun. 10, 2011

(87) PCT Pub. No.: WO2010/072337
PCT Pub. Date: Jul. 1, 2010

(65) Prior Publication Data
US 2011/0248513 A1    Oct. 13, 2011

(30) Foreign Application Priority Data
Dec. 23, 2008 (DE) .......... 10 2008 063 055

(51) Int. Cl.
*F02C 3/34* (2006.01)
*F01K 23/06* (2006.01)
(Continued)

(52) U.S. Cl.
CPC ............... *F02C 3/34* (2013.01); *F01K 23/068* (2013.01); *F02C 3/28* (2013.01); *F02C 6/18* (2013.01); *Y02E 20/16* (2013.01); *Y02E 20/18* (2013.01); *Y02E 20/185* (2013.01); *Y02E 50/12* (2013.01)

(58) Field of Classification Search
CPC ............. F01K 23/068; F02C 3/28; F02C 3/34; F02C 6/18; Y02E 20/16; Y02E 20/18; Y02E 20/185; Y02E 50/12
USPC ................. 60/780, 781, 39.464, 39.47, 39.5, 60/39.511, 39.512, 39.52; 290/1 R
See application file for complete search history.

(56) References Cited

U.S. PATENT DOCUMENTS

| | | |
|---|---|---|
| 5,724,805 A | 3/1998 | Golomb et al. |
| 6,025,403 A | 2/2000 | Marler et al. |

(Continued)

FOREIGN PATENT DOCUMENTS

| | | |
|---|---|---|
| CA | 1071189 A | 2/1980 |
| CA | 2 081 189 | 4/1994 |

(Continued)

OTHER PUBLICATIONS

International Preliminary Report on Patentability and Written Opinion of the International Searching Authority for PCT/EP2009/008864, Aug. 16, 2012.

(Continued)

*Primary Examiner* — J. Gregory Pickett
(74) *Attorney, Agent, or Firm* — Collard & Roe, P.C.

(57) ABSTRACT

A synthesis gas ($H_2$+CO) that comes from a gasifier is supposed to be used in more efficient and optimal manner, particularly for generating electricity, whereby then, $CO_2$ that occurs at the same time is supposed to be passed to storage. This is achieved in that—the synthesis gas ($H_2$+CO) and oxygen ($O_2$) from an air separation system are combusted in a burner, and relaxed by way of a gas turbine (driving a generator), —$CO_2$ is separated in the waste gas stream and passed to a compressor driven by the gas turbine, and—passed to $CO_2$ storage as compressed $CO_2$.

3 Claims, 1 Drawing Sheet

(51) Int. Cl.
*F02C 3/28* (2006.01)
*F02C 6/18* (2006.01)

(56) References Cited

U.S. PATENT DOCUMENTS

| | | |
|---|---|---|
| 6,345,517 B1 | 2/2002 | Jahnke |
| 6,786,050 B1 | 9/2004 | Okada et al. |
| 7,691,714 B2 | 4/2010 | Rotondaro et al. |
| 8,018,044 B2 | 9/2011 | Ikenaga et al. |
| 2003/0008183 A1 | 1/2003 | Hsu |
| 2010/0300112 A1 | 12/2010 | Hannemann et al. |

FOREIGN PATENT DOCUMENTS

| | | |
|---|---|---|
| DE | 35 01 456 | 7/1986 |
| DE | 10 2007 022168 | 11/2008 |
| EP | 0 831 205 | 3/1998 |
| TW | 421695 B | 2/2001 |
| TW | 426728 B | 3/2001 |
| TW | 477812 B | 3/2002 |
| TW | 578324 B | 3/2004 |
| TW | I326471 B | 6/2010 |
| TW | I354354 B | 12/2011 |
| WO | WO 97/07329 | 2/1997 |
| WO | WO 01/75277 | 10/2001 |

OTHER PUBLICATIONS

Publication by the company RWE AG, "IGCC-CCS-Kraftwerk" [IGCC-CCS power plant], 2008, pp. 1-3. (With English translation) (Spec, p. 1).
International Search Report of PCT/EP2009/008864, date of mailing May 18, 2012.
Russian language equivalent of Das grosse polytechnische Lexikon (The great polytechnical encyclopedia), 2000, pp. 478 and 483.

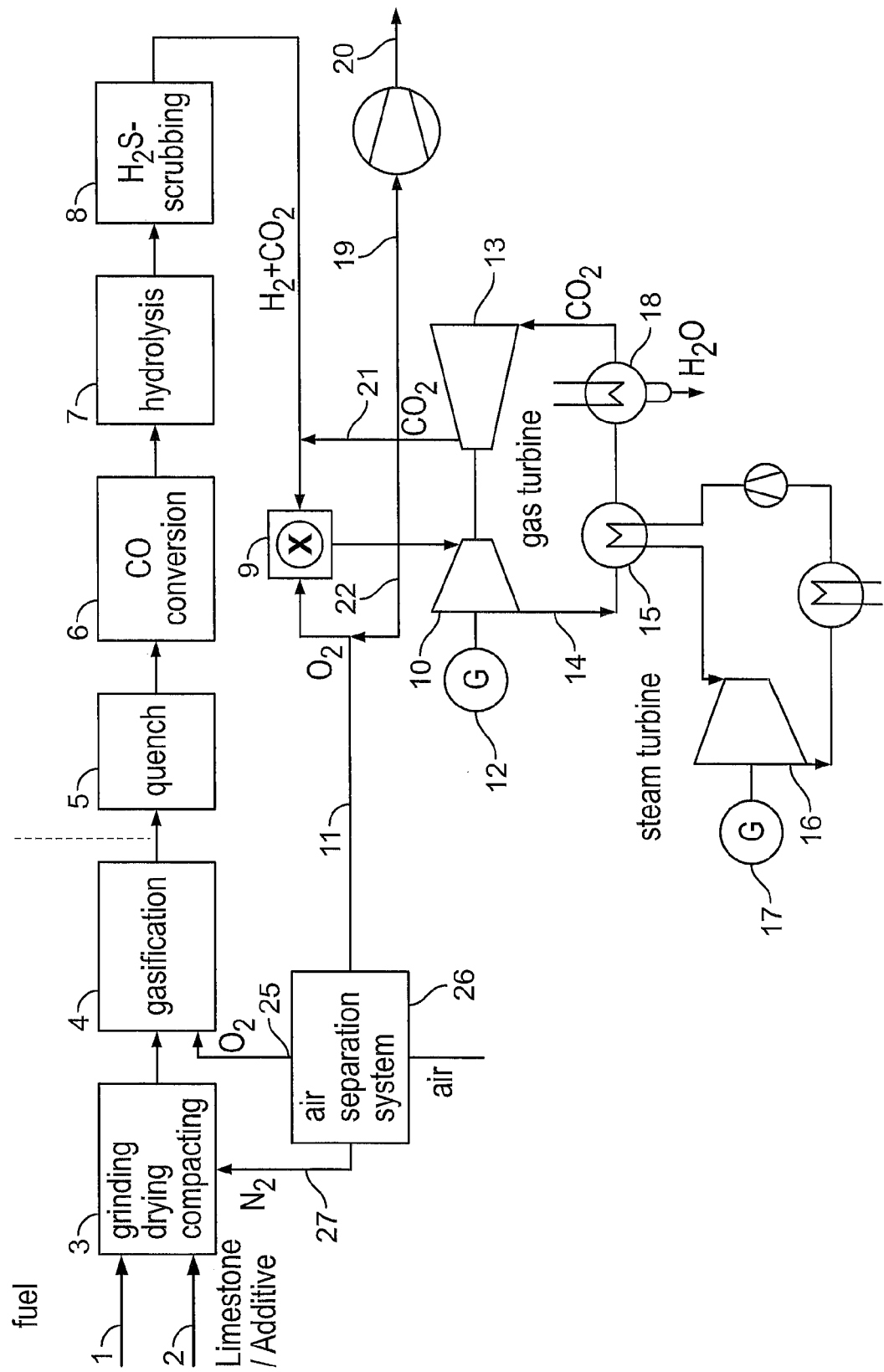

METHOD FOR USE OF THE SYNTHESIS GAS THAT COMES FROM A GASIFIER

CROSS REFERENCE TO RELATED APPLICATIONS

This application is the National Stage of PCT/EP2009/008864 filed on Dec. 11, 2009, which claims priority under 35 U.S.C. §119 of German Application No. 10 2008 063 055.1 filed on Dec. 23, 2008, the disclosure of which is incorporated by reference. The international application under PCT article 21(2) was not published in English.

The invention is directed at a method for use of the synthesis gas ($H_2$+CO) that comes from a gasifier ($H_2$+CO).

$CO_2$ necessarily occurs in the use of fossil fuels. In order not to have to give this off into the atmosphere in the case of such combustion processes, efforts are made to capture and store the $CO_2$.

In a publication by the company RWE AG, "IGCC-CCS-Kraftwerk" [IGCC-CCS power plant], a capture possibility on a large technical scale is described, whereby "IGCC" means Integrated Gasification Combined Cycle (combined power plant with integrated coal gasification). The abbreviation "CCS" means Carbon Capture and Storage.

In the method described, the gasification of coal is combined with $CO_2$ capture, and current is generated in a downstream gas and steam turbine. In this connection, the coal is first converted into a combustible crude gas having the main components CO and $H_2$, in a gasifier, at high temperatures, under pressure of approximately 35 bar. The gas is purified, and the carbon monoxide is converted to $CO_2$ and $H_2O$, in a CO shift reaction, with the aid of steam. After desulfurization, the $CO_2$ is captured, compressed, and passed to storage, whereby the remaining hydrogen is combusted in a gas turbine that drives a generator for generating electricity.

The starting point of the present invention is also fuel gasification for the production of synthesis gas, whereby here, any kind of gasification is included. Such a synthesis gas should then be used in efficient and optimal manner, particularly for generating electricity, whereby the $CO_2$ that occurs at the same time is supposed to be passed to storage.

This task is accomplished, according to the invention, with a method of the type mentioned initially, in that
the synthesis gas ($H_2$+CO) and oxygen ($O_2$) from an air separation system are combusted in a burner, and relaxed by way of a gas turbine (driving a generator),
$CO_2$ is separated in the waste gas stream and passed to a compressor driven by the gas turbine, and
passed to $CO_2$ storage as compressed $CO_2$.

The invention makes use, in simple manner, of direct one-stage or two-stage compression of the $CO_2$ gas stream to pressures that allow storage of the $CO_2$, if necessary after further compression.

In U.S. Pat. No. 5,724,805, a method is known in which liquid $CO_2$ is collected in a tank, among other things. In this connection, tapping of the $CO_2$ passed to sequestration takes place on the pressure-free side of the gas turbine, after the waste heat steam generator. Therefore the full compression power for the sequestration must be generated separately, while in the case of the present invention, pre-compression by the compressor of the gas turbine itself takes place, as indicated above. Here, the full compression power is therefore utilized by the gas turbine. Liquefaction of the $CO_2$ does not take place.

Embodiments of the invention are evident from the dependent claims. In this connection, it can be provided that part of the compressed $CO_2$ gas is passed to the burner, for temperature control.

Feed of the compressed $CO_2$ gas into streams that lead to the burner can take place at different positions. Either directly into the synthesis gas stream that is fed to the burner, or also into the oxygen stream from the air separation system that is fed to the burner.

Further optimization of the method of operation according to the invention consists in that heat for operation of a steam turbine is taken from the waste gas stream from the gas turbine, by way of a heat exchanger, whereby the steam turbine can be used to drive a generator.

A further embodiment consists in that the stream that leaves the gas turbine is subjected to separation of $CO_2$ and steam, in such a manner that pure $CO_2$ is applied to the compressor coupled with the gas turbine.

Further characteristics, details, and advantages of the invention are evident from the example described below, using the fundamental schematic of a system according to the invention.

A fuel generally indicated with 1, along with additives 2, is passed to grinding and drying and a pressurized space, as indicated with 3. The fuel can be slurry, hard coal or soft coal, biomass, petcoke, oil sand, Orimulsion, treated garbage, and the like. This fuel is then applied to a gasification system 4, together with oxygen (line 25) from an air separation system 26, whereby nitrogen, for example, is applied to the region of grinding, drying, and compacting 3, by way of the line 27.

The crude gas that comes from the gasification system 4 is first introduced into the quench 4a that serves to remove dust from the gas. Here, not only the dust but, at the same time, the ammonia that is present in the gas and the hydrogen cyanide, as well as the hydrogen sulfide, are washed out almost completely. This product is then applied to the subsequent $CO_2$ conversion, whereby this step serves to increase the synthesis gas temperature and to react COS to $H_2S$ and HCN to $NH_3$ and CO. High-temperature conversion and medium-temperature and low-temperature conversion are known, for example, whereby other methods can also be used. In the example shown, the conversion 4b is followed by hydrolysis 4c for removal of carbonyl sulfide. Here, the carbonyl sulfide that is present in the gas, and is very difficult to wash out with water and other usual solvents, is converted to hydrogen sulfide by means of catalytic hydrolysis, whereby the carbonyl sulfide reacts with steam, in the gas phase, according to the reaction equation $COS+H_2O \rightarrow H_2S+CO_2$.

Finally, $H_2S$ scrubbing 8 still follows, whereby here, the hydrogen sulfide present in the gas is adsorptively washed out with a scrubbing solution that acts selectively. In this connection, it should be noted that other possibilities for $H_2S$ removal are also possible, such as high-temperature dry desulfurization, for example.

After these treatment steps, the gas has sufficient purity so that it can be passed to the combustion chamber, indicated with 9, of a gas turbine 10.

As is evident from the fundamental schematic, oxygen that comes from the air separation system 26 is also applied to the combustion chamber 9, by way of the line 11.

Not only a generator 12 that produces electricity, but also a gas compressor 13 is coupled with the gas turbine 10; this compressor compresses the gas that leaves the gas turbine according to line 14, whereby according to the invention, this is a $CO_2$ compressor. The waste gas that leaves the gas turbine 10 is passed to steam generation by way of a heat exchanger 15, whereby the steam that is formed is passed to another gas turbine 16 having a generator 17 for producing electricity.

After the heat exchanger 15, the gas stream 14 is subsequently passed by way of a $CO_2$/steam separation device, indicated in general with 18. The $CO_2$ that leaves the $CO_2$ compressor 13 is then passed to $CO_2$ storage, by way of the line 19, as indicated with the line 20.

As is also shown in the figure, the $CO_2$ gas that leaves the $CO_2$ compressor 13 can particularly also be passed into the burner chamber 9 to regulate its temperature, either according to arrow 21, to the synthesis gas stream, or by way of the line 22, to the $O_2$ stream 11 that comes from the air separation system.

Of course, the example described can still be modified in many respects without departing from the basic idea. For example, as has already been indicated above, any type of gasifier can be used here; in the area of CO conversion, a gas/gas heat exchanger can also be provided, if necessary, in order to achieve the temperature for hydrolysis, and more of the like.

The invention claimed is:

1. Method for use of a synthesis gas ($H_2$+CO) that comes from a gasifier,
wherein
the synthesis gas ($H_2$+CO) and oxygen ($O_2$) from an air separation system are combusted in a burner, and relaxed by way of a gas turbine, the gas turbine driving a generator,
$CO_2$ is separated in the waste gas stream and passed to a compressor driven by the gas turbine, and
passed to $CO_2$ storage as compressed $CO_2$ gas, and
part of the compressed $CO_2$ gas is passed to the burner for temperature control.

2. Method according to claim 1, wherein the part of the compressed $CO_2$ gas is passed to the synthesis gas stream or to the $O_2$ stream from the air separation system ahead of the burner.

3. Method according to claim 1, wherein heat for operation of a steam turbine is taken from the waste gas stream from the gas turbine, by way of a heat exchanger.

* * * * *